(12) United States Patent
Simonyi (10) Patent No.: US 7,756,859 B2
(45) Date of Patent: Jul. 13, 2010

(54) MULTI-SEGMENT STRING SEARCH

(75) Inventor: Charles Simonyi, Medina, WA (US)

(73) Assignee: Intentional Software Corporation, Bellevue, WA (US)

( * ) Notice: Subject to any disclaimer, the term of this patent is extended or adjusted under 35 U.S.C. 154(b) by 402 days.

(21) Appl. No.: 11/311,891

(22) Filed: Dec. 19, 2005

(65) Prior Publication Data

US 2007/0150469 A1    Jun. 28, 2007

(51) Int. Cl.
G06F 7/00 (2006.01)
G06F 17/30 (2006.01)

(52) U.S. Cl. .................. 707/718; 707/719; 707/721

(58) Field of Classification Search .................. None
See application file for complete search history.

(56) References Cited

U.S. PATENT DOCUMENTS

| | | | | |
|---|---|---|---|---|
| 5,469,354 A * | 11/1995 | Hatakeyama et al. | .......... | 707/3 |
| 5,768,423 A * | 6/1998 | Aref et al. | .................... | 382/228 |
| 5,995,921 A * | 11/1999 | Richards et al. | ................ | 704/9 |
| 6,014,659 A * | 1/2000 | Wilkinson et al. | ............. | 707/3 |
| 6,018,735 A * | 1/2000 | Hunter | ........................ | 707/5 |
| 6,108,444 A * | 8/2000 | Syeda-Mahmood | ......... | 382/186 |
| 6,240,409 B1 * | 5/2001 | Aiken | ............................ | 707/4 |
| 6,785,677 B1 * | 8/2004 | Fritchman | ...................... | 707/6 |
| 7,277,029 B2 * | 10/2007 | Thiesson et al. | ............. | 341/22 |
| 2002/0169755 A1 | 11/2002 | Framroze et al. | | |
| 2003/0139920 A1 * | 7/2003 | Abir | ............................. | 704/2 |
| 2005/0131926 A1 | 6/2005 | Chakraborty et al. | | |

\* cited by examiner

*Primary Examiner*—Charles Rones
*Assistant Examiner*—Daniel Kuddus
(74) *Attorney, Agent, or Firm*—Perkins Coie LLP (57) ABSTRACT

A method and system for searching multi-segment strings is provided. The search system receives a query string containing part or all of the segments that are to be matched as query segments. Upon receiving the query string, the search system compares the query segments provided in the query string with segments gathered from previously stored strings. If any segments match the query segments, the search system selects the strings that contain matching segments as search results.

11 Claims, 11 Drawing Sheets

MULTI-SEGMENT STRING SEARCH

BACKGROUND

Several circumstances give rise to strings of characters made up of one or more segments connected together. For example, in C++ programming variable names cannot contain spaces, but should be descriptive enough for a programmer to understand how the variable is used. One common mechanism for providing the necessary description is called CamelCase, in which a variable name is made up of one or more concatenated words or word substitutes (e.g., "int" for "integer"), each of which is capitalized, thus creating the appearance of humps in the name like the humps of a camel (i.e., Bactrian rather than dromedary). For example, a variable containing the number of disk drives on a computer could be named DiskDriveCount. CamelCase has been used beyond computer science; for example, many corporate trade names have adopted this technique for providing a single string made up of multiple segments (i.e., EarthLink, PlayStation, DaimlerChrysler). Other mechanisms of separating segments within a string are also common; for example, segments may be separated by a special character such as an underscore (i.e., disk_drive_count in the programming example above), or by punctuation as is commonly used in .NET programming (i.e., System.IO where a period is used to separate the segments).

Where strings are made up of several segments, traditional search methods do not point the searcher to the best results. For example, if a programmer searching for a function that deletes a file uses a simple substring search with the string "file," the search will return results that include not only file manipulation functions, but also unrelated functions for manipulating profiles (since "profile" contains the substring "file"). The programmer may know that the function he is looking for contains both a word starting with "De" and the word "file," but may not remember whether the function is called "DelFile" or "DeleteFile" or "DeleteAFile." Using traditional search methods, the search for "De" and "file" may return the correct function name (e.g., "DeleteFile") but may also return so many incorrect function names (e.g. GetProfileDescription" and "LaunchProfileReader") that it may be difficult to identify the function of interest.

SUMMARY

A method and system for searching multi-segment strings is provided. In some embodiments, the search system receives a query string containing part or all of the segments that are to be matched as query segments. Upon receiving the query string, the search system compares the query segments provided in the query string with segments gathered from previously stored strings. If any segments match the query segments, the search system selects the strings that contain matching segments as search results. Alternatively, the search system may also include strings with partial matches in the search results. A partial match is a string that has segments that match some but not all of the query segments. The search system may rank search results based on the closeness of the match to make it easier for a user to identify the best matching string.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for searching multi-segment strings is provided. In some embodiments, the search system receives a query string containing part or all of the segments that are to be matched as query segments. For example, a programmer looking for a function to delete a file might input "DeFi" thereby specifying the first few letters of each segment and separating them by using CamelCase as described above. Upon receiving the query string, the search system compares the query segments (e.g., "De" and "Fi") provided in the query string with segments gathered from previously stored strings. For example, the string "DeleteFile" has the segments "Delete" and "File," and the string "CopyFile" has the segments "Copy" and "File." If any segments match the query segments, the search system selects the strings that contain matching segments as search results. For example, if the strings include DeleteFile, CopyFile, and DeleteProfile, DeleteFile would be selected as a match since it contains segments beginning with both "De" and "Fi."

Alternatively, the search system may also include strings with partial matches in the search results such as "CopyFile" and "DeleteProfile." A partial match is a string that has segments that match some but not all of the query segments. For example, the string DeleteProfile matches the "De" query segment, but does not match the "Fi" query segment. The search system may rank search results based on the closeness of the match to make it easier for a user to identify the best matching string. In this way, the search system can identify strings whose segments best match the query segments of the query string.

In some embodiments, the search system performs a traditional search using the query string after performing a segment-based search and adds any matches to the search results. This additional search may find strings in circumstances where the user did not correctly spell one of the segments in a query string, or where the user incorrectly divided the segments in the query string. For example, if a user is looking for a function to recover a file, and the function is named UndeleteFile, the user may search for "DeleteFile" thinking that the function contained three words such as "UnDeleteFile." In this example, if the search system only searched the beginning of segments, it would not add the correct function to the search results. However, by also performing a traditional string search, the search system will add the correct function to the results.

In some embodiments, the search system stores the strings in a string table. The string table has an index with an entry for each segment of a string, and each entry points to the strings that contain that segment. When the user performs a search, the search system divides the query string into query segments and matches each segment with the segments in the index. When matching segments are found, the strings containing those segments (both partial and complete matches) are added to the search results.

In some embodiments, the search system exposes an interface for adding, removing, and updating strings to the string table. For example, a software development project often contains many symbols, such as function names, variable names, and special types such as classes that are multi-segment strings. A project management system can automatically add these symbols to the string table using the exposed interface so that a user of the project management system can find symbols in the project using the search system. A software development project may also utilize symbols available through a published application programming interface (API), which may also be added to the string table using the exposed interface so that a user may easily find available functions or other symbols for use in a project. When adding or updating strings in the string table, the interface exposed by the search system can also allow the segmentation of the strings to be specified along with the strings themselves. This allows providing a custom component for dividing strings into segments that is specific to a particular project or problem domain. For example, one project may define that segments are delimited by dashes (e.g., "mod-update-1"), while another project may only allow a string to comprise predefined segments (e.g., "UnDelFile" where the predefined segments include "Un," "Del," and "File.").

In some embodiments, the search system allows concurrent operations to the string table by maintaining a version number that is modified each time the string table changes. Long operations that would normally need to have exclusive access to the string table can be performed simultaneously with other operations by monitoring the version to detect changes. For example, if one user is enumerating strings of the string table, and another user adds a string to the string table, the enumerating user will know that a string has been added, and can modify the enumeration to account for the added string by examining the version number.

In some embodiments, the search system stores the segments in the string table as a b-tree based on segment prefixes. The branch nodes of the b-tree contain alphabetized segment prefixes of the minimal length necessary to distinguish their child nodes. The leaf nodes reference the full segment and hold a list of references to strings containing each segment. The tree grows uniformly such that all leaf nodes are on the same level and can be read linearly to traverse the tree alphabetically. When a search is performed, the search system compares each query segment to the tree nodes starting at the root. The search system may store the nodes on a permanent storage medium and load them only as needed in order to use memory more efficiently. The search system traverses the tree until all matching leaf nodes are found. The matching segments referenced by the leaf nodes are then used to select strings for inclusion in the search results.

In some embodiments, the search system ranks search results according to the degree to which they match the query string. When matching segments are found in the string table, the search system assigns a score based on the level of matching. For example, a query segment in the query string found at the beginning of a segment in a string in the string table may have a higher score than a matching segment found in the middle. When a string contains segments matching more than one query segment, the search system may increase the score of the search result for that string, giving strings with more than one matching segment a higher score. Finally, the search system may examine the order in which query segments appear in the query string relative to the order of each matching segment in the string table and assign a score to results based on the similarity of the order.

In some embodiments, the query string contains an indication that a query segment or the entire query string should be matched exactly. For example, a "\" character at the end of a query segment can indicate that it specifies a full segment and only exact matches should be returned. For example, for a query string "Delete\Fi" the multi-segment string "DeleteFile" would be a valid search result, but "DeletedFile" would not. A "\\" placed at the end of a query string can indicate that the whole string should be exactly matched. For example, for a query string "DeleteFile\\" the multi-segment strings "DeleteFile" and "UnDeleteFile" would be valid search results, but "DeleteAFile" would not.

In some embodiments, the search system divides the query string into query segments using a specified set of separator conditions. For example, the query string may be divided by CamelCase as described above (i.e., "DeFi"), or by other mechanisms such as a special character (i.e., "de_fi" or "de.fi"). The user may configure the rules used for separating segments in strings and query segments in query strings. For example, the user may configure rules that conform to a naming convention for a particular software project. The user may also specify that search results should be limited to strings containing the same separator condition as the query string. For example, whether "DeleteFile" could be found by searching for both "de_fi" and "DeFi" would depend upon the configuration. The user may also configure whether the search should be case-sensitive, and whether the specified query segments should be matched to the beginnings of segments from the stored list, or based on some other criteria such as matching any substring within a segment or the end of the segment.

Figure 1:
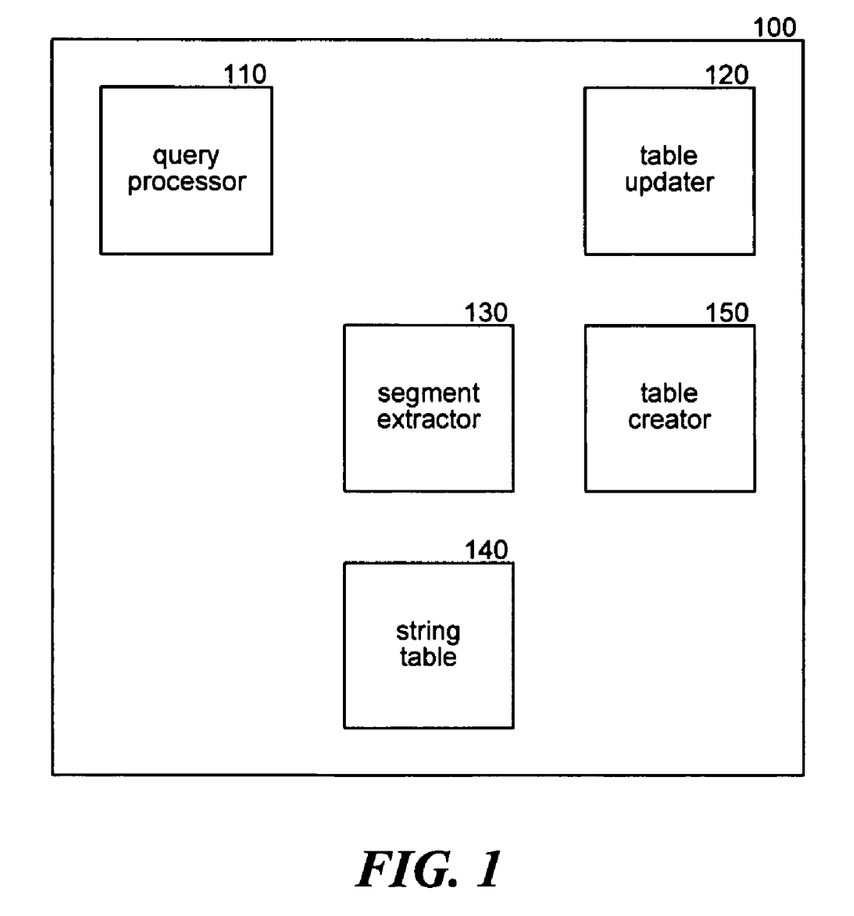
FIG. 1 is a block diagram that illustrates the components of the search system in one embodiment.

FIG. 1 is a block diagram that illustrates the components of the search system in one embodiment. The search system 100 contains a query processor component 110, a table updater component 120, a segment extractor component 130, a string table component 140, and a table creator component 150. The query processor 110 receives query strings, uses the segment extractor 130 to divide the query string into query segments, and searches the string table 140 for matching strings based on the specified query segments. The table updater 120 processes requests to add, remove, and update the list of strings stored in the string table 140. The segment extractor 130 is used by the query processor 110, the table creator 150, and the table updater 120 to divide query strings and stored strings into their segments. The string table 140 stores the list of strings and provides quick search and retrieval based on the segments contained within the strings. The table creator 150 creates the initial string table.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be transmitted via a data transmission medium, such as a signal on a communication link or stored via a storage device. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
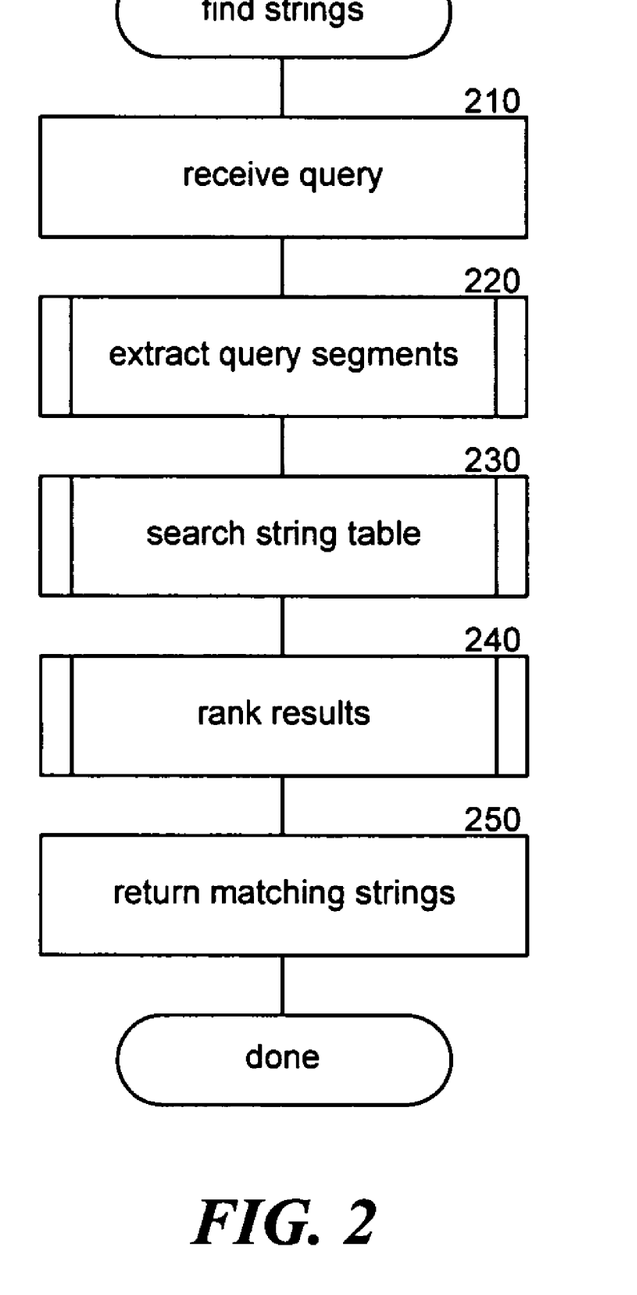
FIG. 2 is a flow diagram that illustrates the operation of the query processing component in one embodiment.

FIG. 2 is a flow diagram that illustrates the operation of the query processing component in one embodiment. The query processing component is invoked to provide search results when the search system receives a user query string. In block 210, the component receives a query string. In block 220, the component uses the segment extractor component to extract query segments from the query string. In block 230, the component searches the string table for segments that match the specified query segments, and retrieves the corresponding strings. In block 240, the resulting strings are ranked according to the degree of matching with the received query string. In block 250, the matching strings are returned as search results. The component then completes.

Figure 3:
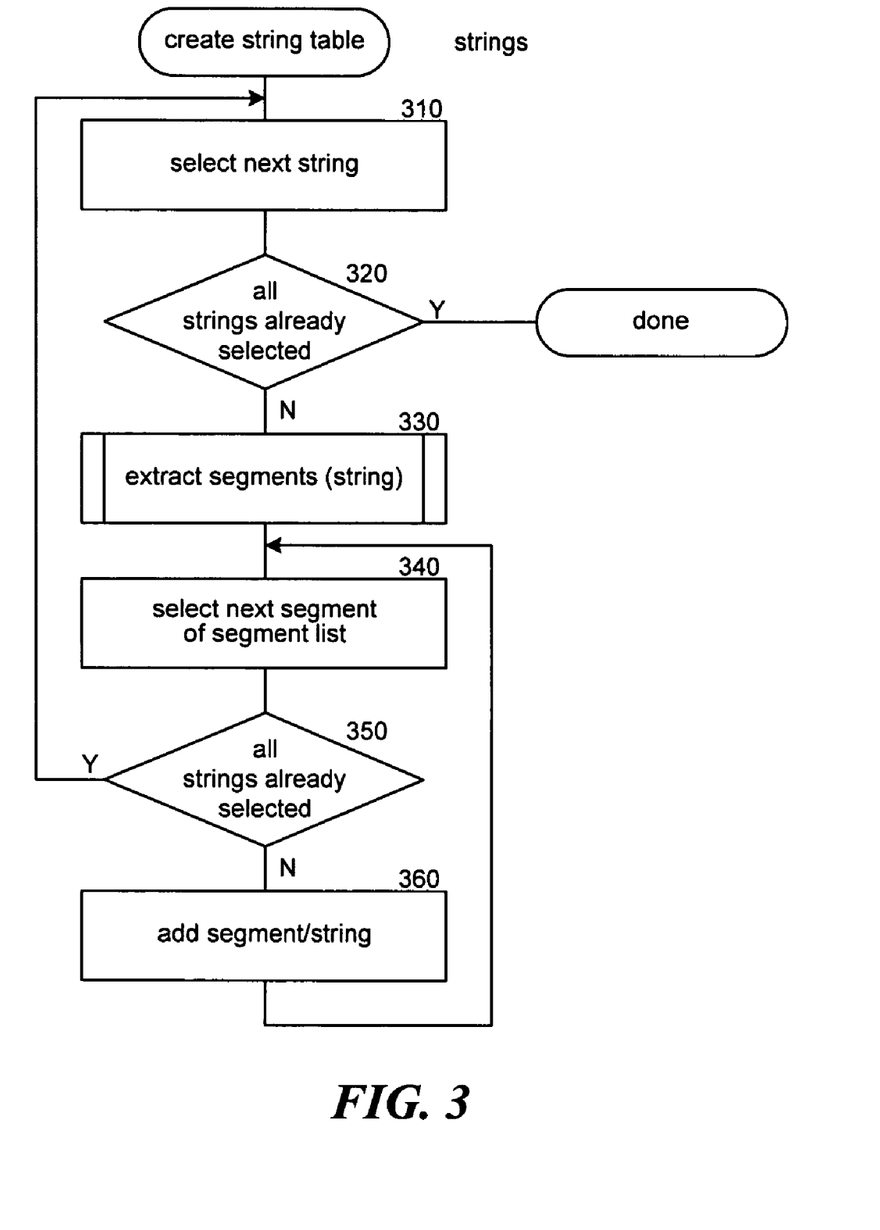
FIG. 3 is a flow diagram that illustrates the operation of the string table creator component in one embodiment.

FIG. 3 is a flow diagram that illustrates the operation of the string table creator component in one embodiment. The string table creator component is invoked to create the string table from a list of strings. In block 310, the component selects the next string from a list of strings to be placed into the string table. In decision block 320, if all of the strings have been selected, the component completes, else the component continues at block 330. In block 330, the component extracts segments from the selected string into a segment list by invoking the extract segments component. In blocks 340-360, the component loops adding each string segment to the string table. In block 340, the component selects the next segment in the segment list. In decision block 350, if all of the segments have been selected, the component loops to block 310 to select the next string, else the component continues at block 360. In block 360, the component adds the selected segment and a reference to the string containing it to the string table. The component then loops to block 340 to select the next segment in the segment list.

Figure 4:
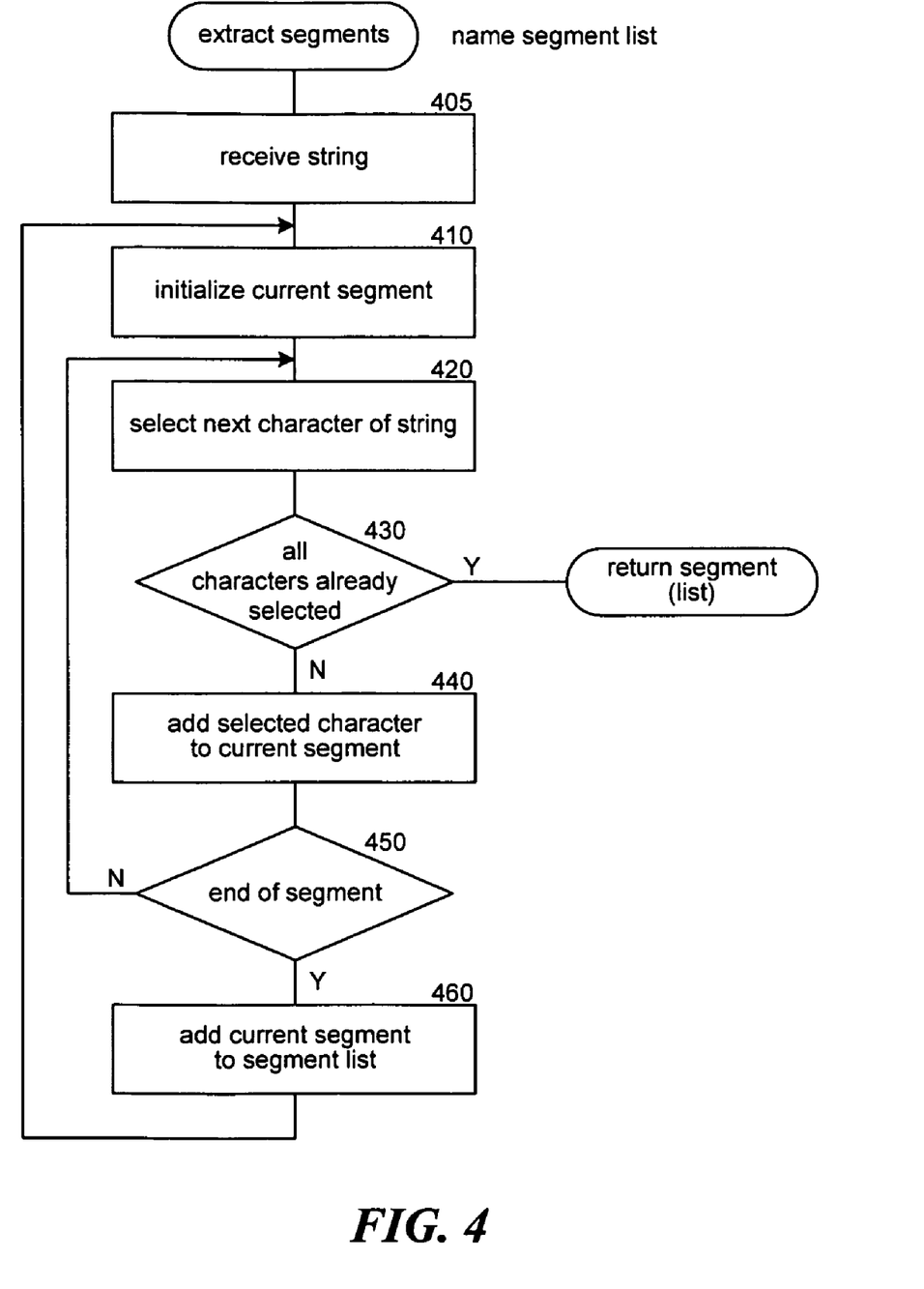
FIG. 4 is a flow diagram that illustrates the operation of the segment extractor component in one embodiment.

FIG. 4 is a flow diagram that illustrates the operation of the segment extractor component in one embodiment. The component is invoked to separate strings into string segments. In block 405, the component receives a string that is to be divided into segments. In block 410, the component initializes the current segment. In block 420, the component selects the next character of the string. In decision block 430, if there are no more characters in the string, the component returns the list of segments found, else the component continues at block 440. In block 440, the component adds the selected character to the current segment. In decision block 450, if the character is the end of the current segment, the component continues at block 460, else the component loops to block 420 and selects the next character of the string. In block 460, the component adds the current segment to the list of segments found. The component then loops to block 410 to extract the next segment.

Figure 5:
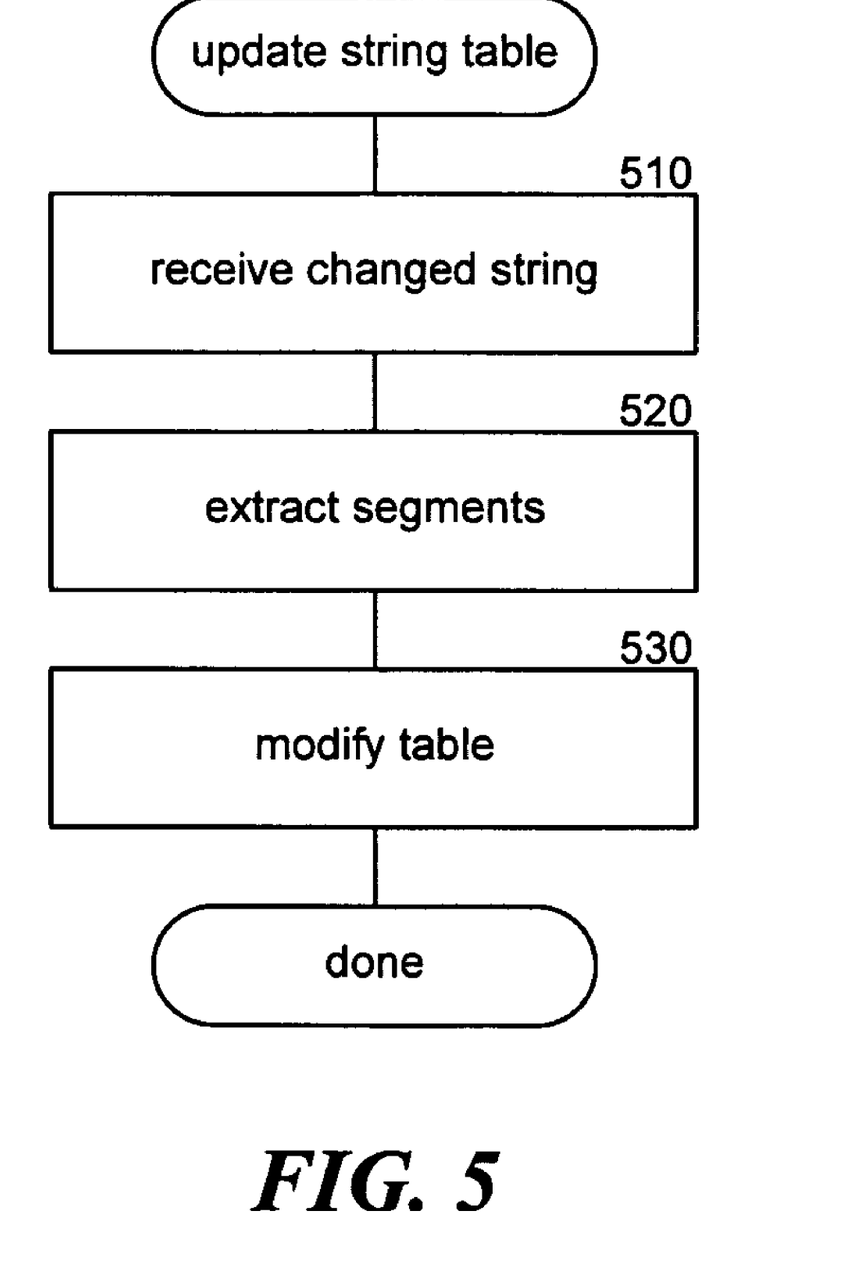
FIG. 5 is a flow diagram that illustrates the operation of the table updater component in one embodiment.

FIG. 5 is a flow diagram that illustrates the operation of the table updater component in one embodiment. The component is invoked when strings in the string table are added, removed, or updated. In block 510, the component receives a string to be added, removed, or updated. In block 520, the component uses the segment extractor to divide the string into its constituent segments. In block 530, the component modifies the string table, for example, by adding a new string and its constituent segments to the string table. The component then completes.

Figure 6:
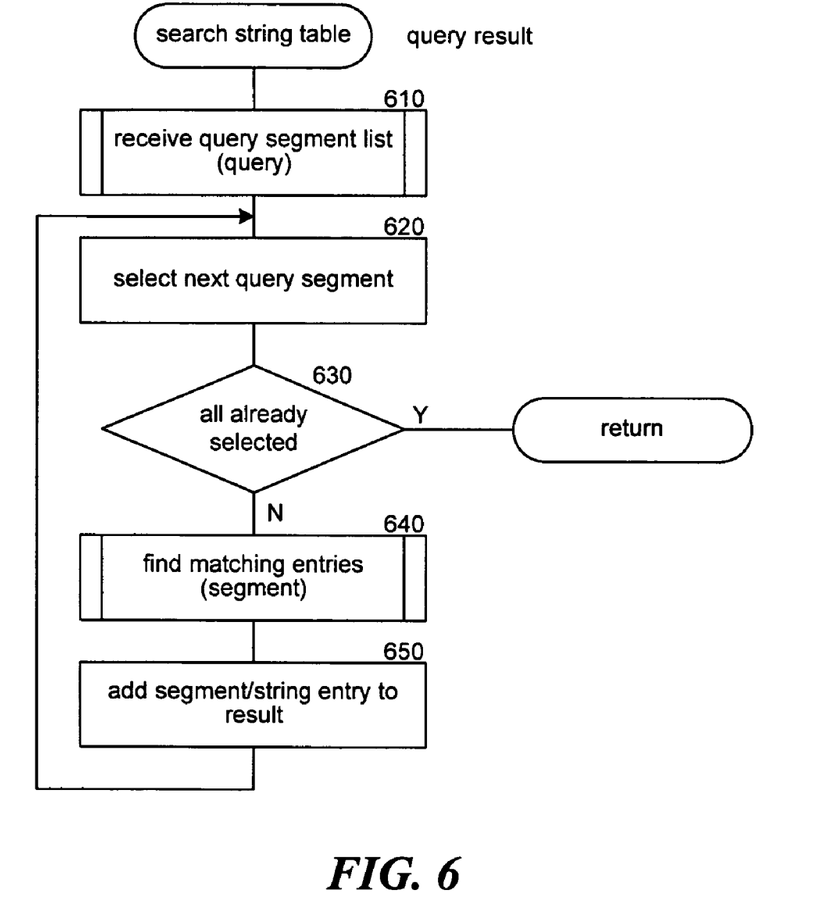
FIG. 6 is a flow diagram that illustrates the operation of the query processing component to search the string table in one embodiment.

FIG. 6 is a flow diagram that illustrates the operation of the query processing component to search the string table in one embodiment. The component searches the string table for a given list of query segments. In block 610, the component receives the list of query segments in the query string from the segment extractor component. In block 620, the component selects the next segment in the query segment list. In decision block 630, if all of the segments in the list have been selected, the component returns the list of matching entries, else the component continues at block 640. In block 640, the component finds entries in the string table that match the selected segment. In block 650, the component adds any entries found to the list of matching entries. The component then loops to block 620 to select the next segment in the query segment list.

Figure 7:
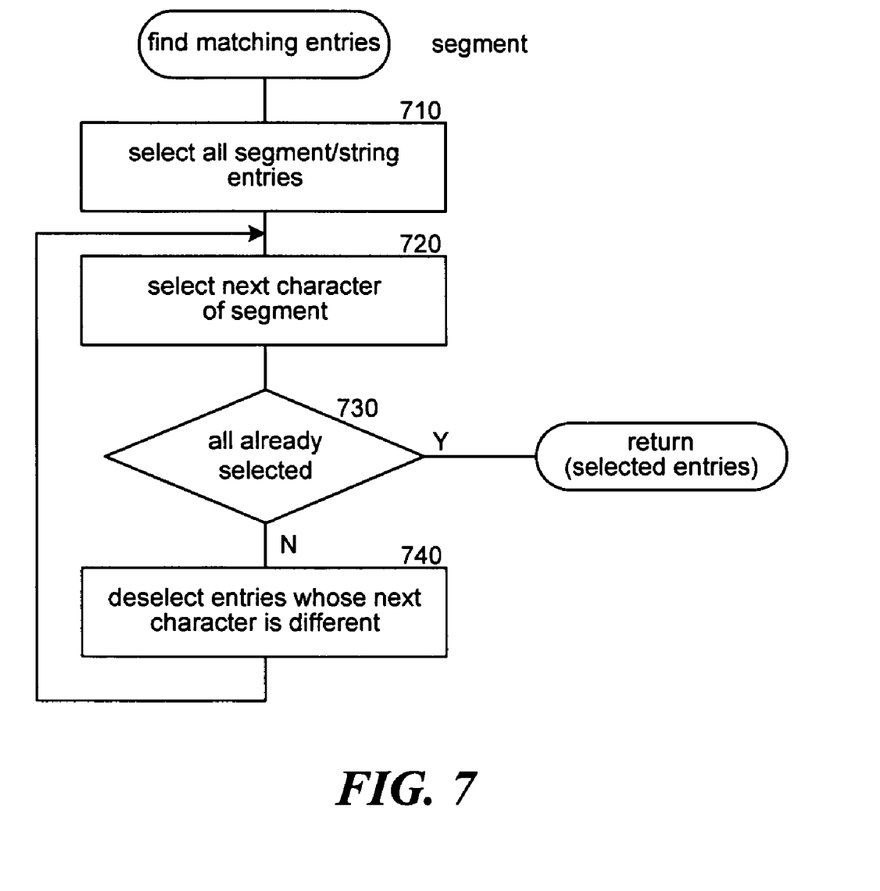
FIG. 7 is a flow diagram that illustrates the operation of the query processing component to find matching entries for a segment when searching the string table in one embodiment.

FIG. 7 is a flow diagram that illustrates the operation of the query processing component to find matching entries for a segment when searching the string table in one embodiment. The component is invoked to search the string table for a particular query segment. In block 710, the component selects all entries in the string table. In block 720, the component selects the next character of the segment. In decision block 730, if all characters of the segment have been selected, the component returns the selected entries, else the component continues at block 740. In block 740, the component deselects any entries whose next character does not match the selected character of the segment. The component then loops to block 720 to select the next character of the segment.

Figure 8:
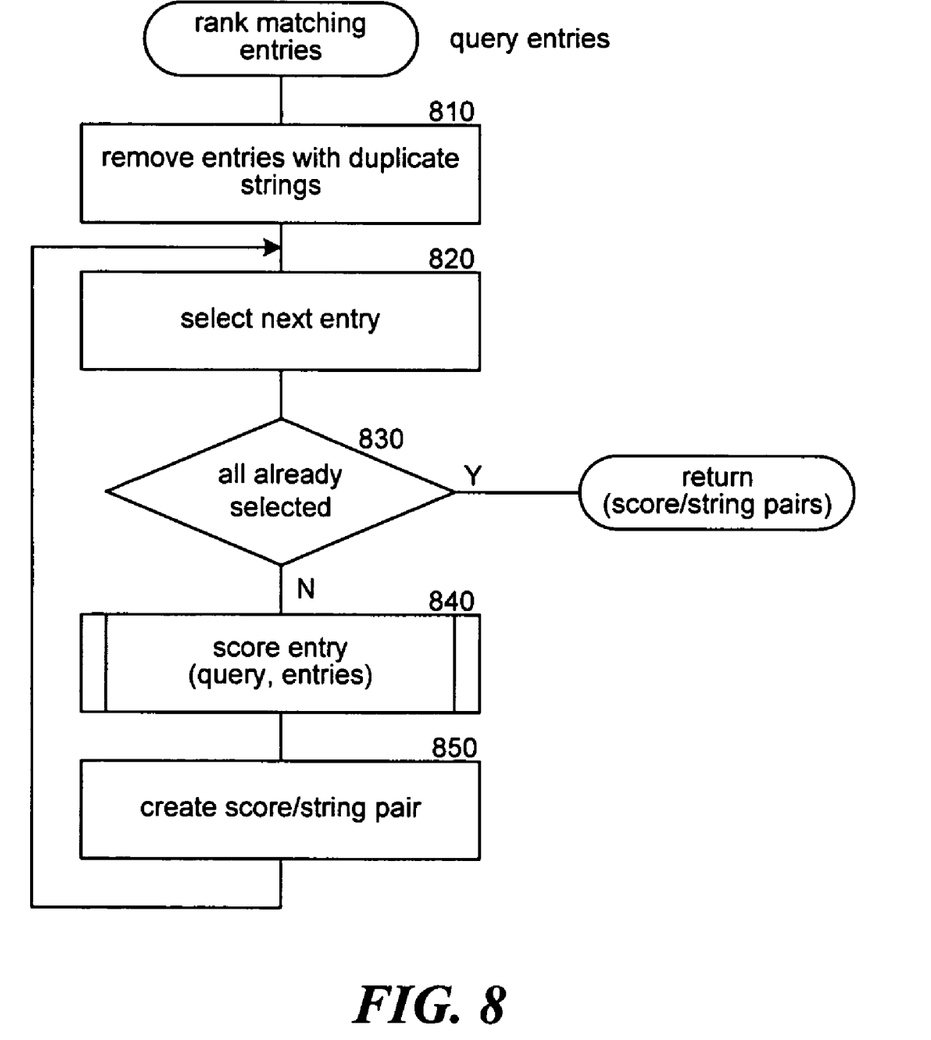
FIG. 8 is a flow diagram that illustrates the operation of the query processing component to rank search results in one embodiment.

FIG. 8 is a flow diagram that illustrates the operation of the query processing component to rank search results in one embodiment. In block 810, the component removes results with duplicate strings. In block 820, the component selects the next search result. In decision block 830, if all search results have been selected, the component returns a list of score/identifier pairs, else the component continues at block 840. In block 840, the component scores the selected entry based on the level of matching and the similarity of order of segments in the entry and query segments in the query string. In block 850, the component creates a score/identifier pair and adds it to the list. The component then loops to block 820 to select the next search result.

Figure 9:
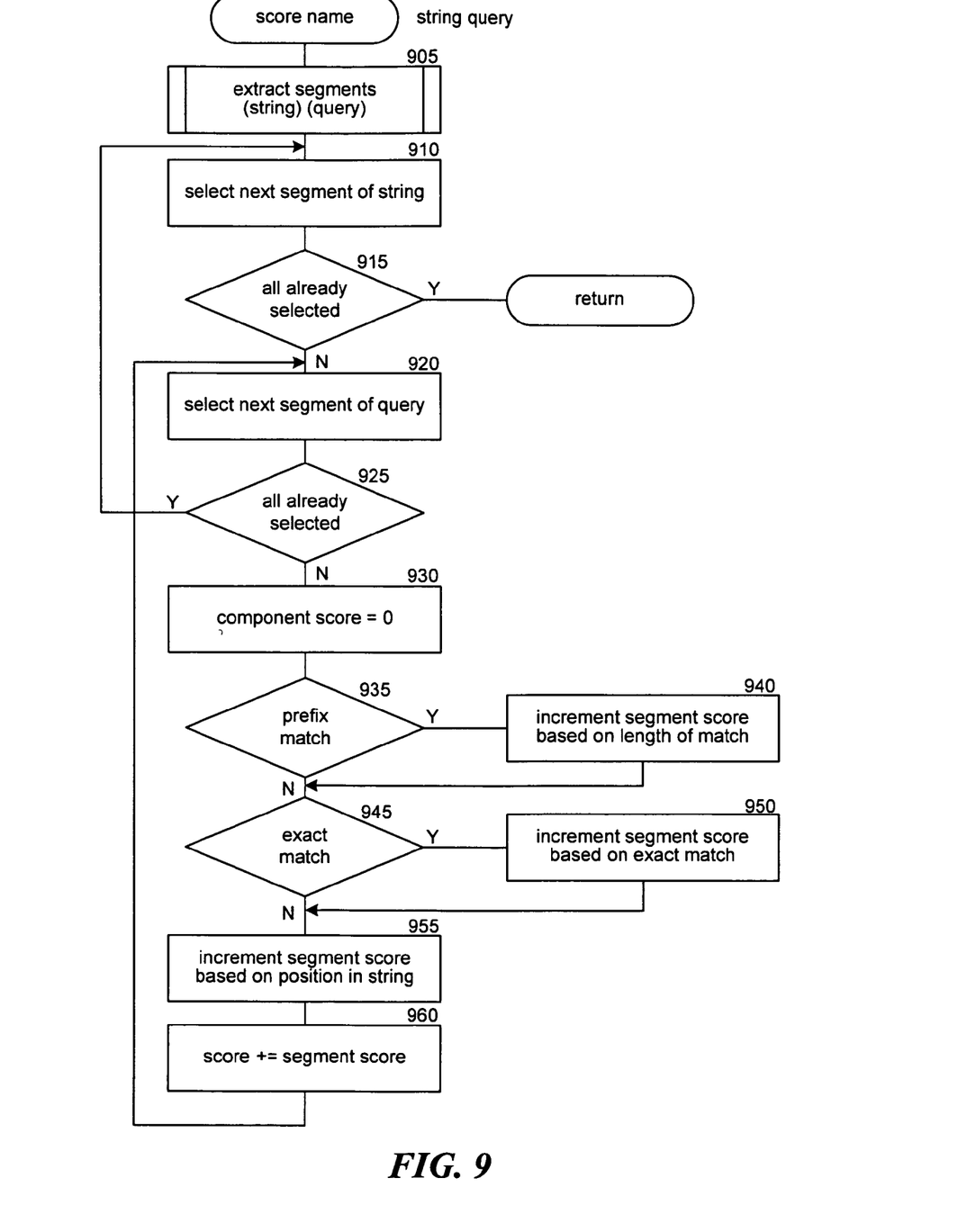
FIG. 9 is a flow diagram that illustrates the operation of the query processing component to score a matching string in one embodiment.

FIG. 9 is a flow diagram that illustrates the operation of the query processing component to score a matching string in one embodiment. In block 905, the component uses the segment extractor to obtain lists of segments from the query string and the matching string. In block 910, the component selects the next segment in the matching string. In decision block 915, if all segments have been selected the component returns the score for the matching string, else the component continues at block 920. In block 920, the component selects the next segment in the query string. In decision block 925, if all segments in the query string have been selected, the component loops to block 910 to select the next segment in the matching string, else the component continues at block 930. In block 930, the component initializes the score for the currently selected pair of segments. In decision block 935, if the prefixes of the segments match, the component continues to block 940, else the component continues at block 945. In block 940, the component increments the score based on the length of match. In decision block 945, if the segments exactly match, the component continues at block 950, else the component continues at block 955. In block 950, the component increments the score based on the exact match. In block 955, the component increments the score based on the position of the segment in the query string relative to the position of the segment in the matching string. In block 960, the component adds the score for the current segments to the total score for the matching string. The component then loops to block 920 to select the next segment in the query string.

Figure 10:
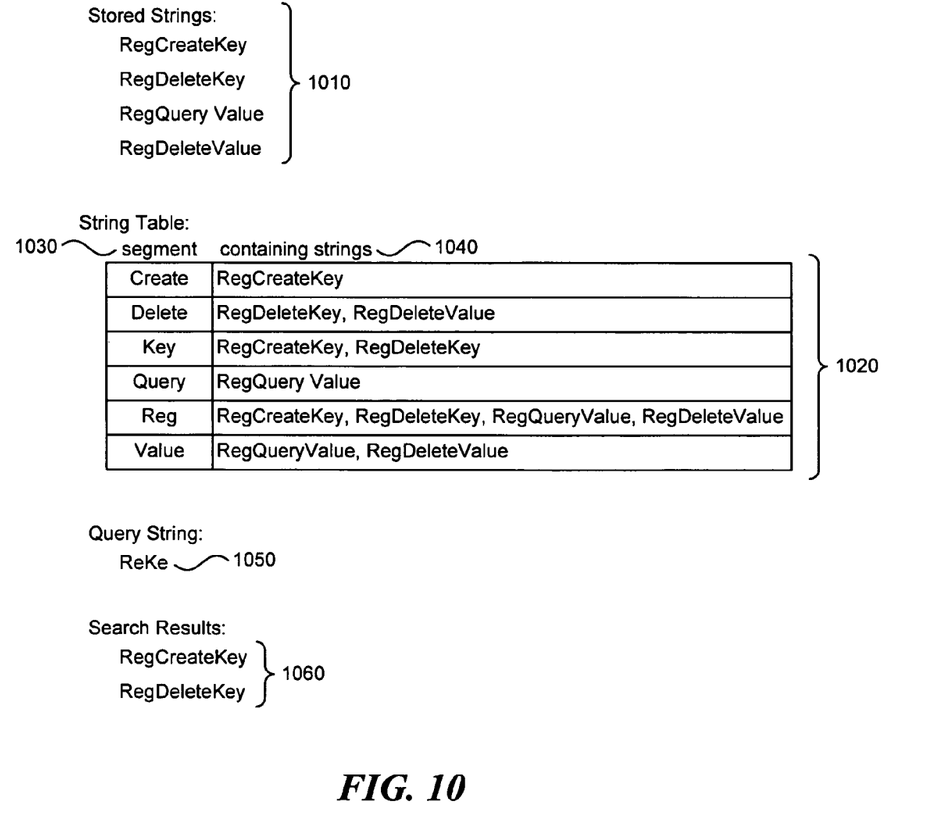
FIG. 10 illustrates an example search using the search system in one embodiment.

FIG. 10 illustrates an example search using the search system in one embodiment. In this example, four strings 1010 have been added to the string table 1020. The string table 1020 contains a column 1030 specifying each of the segments extracted from the four strings 1010 using the segment extractor, and a reference 1040 to each of the strings that contain each segment 1030. A received query string 1050 is divided into query segments, and each query segment is matched to the segments in the string table 1020. For segments that match, the strings 1040 referenced in the string table are added to a list of results 1060. The list of results 1060 shown has been filtered to remove duplicate strings retrieved from the string table.

Figure 11:
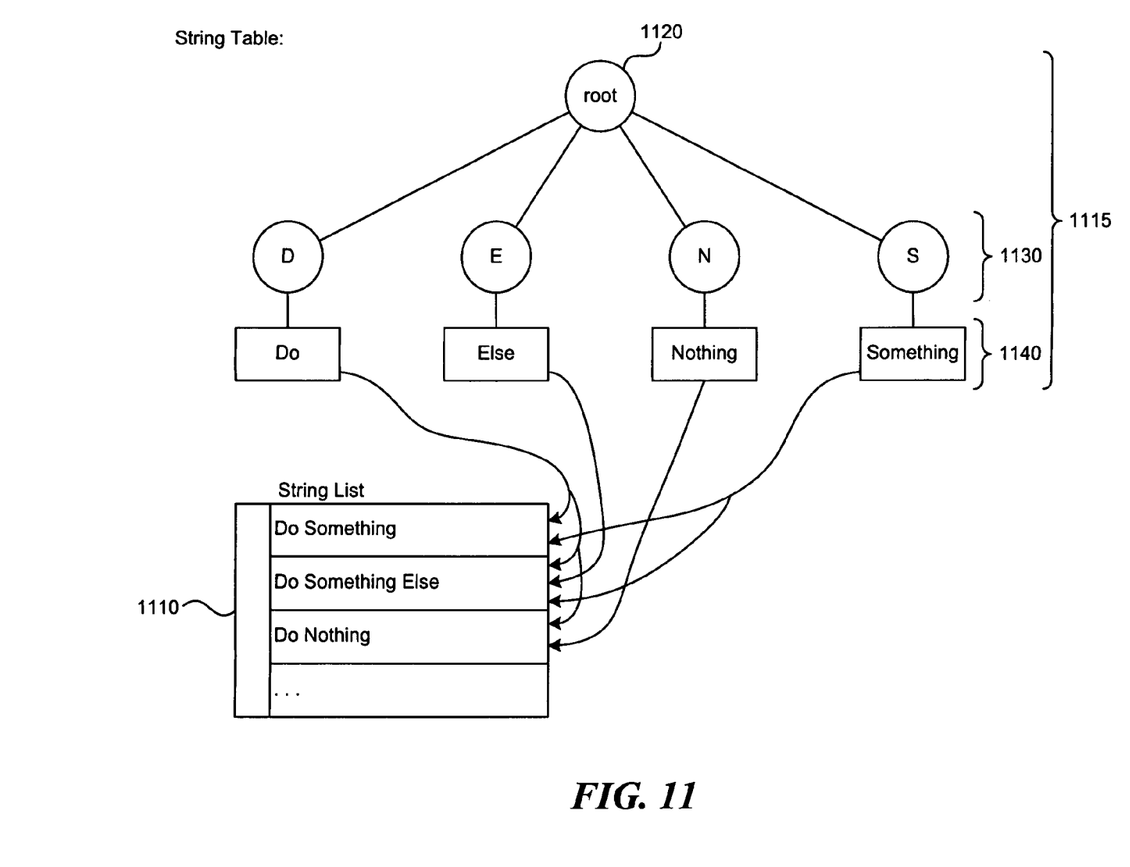
FIG. 11 illustrates a b-tree used to index the string table in one embodiment.

FIG. 11 illustrates a b-tree used to index the string table in one embodiment. The tree 1115 contains a root node 1120. The root node contains branch nodes 1130 that specify the text that is common to the leaf nodes below them. The branch nodes 1130 connect to leaf nodes 1140 that specify individual segments that are part of strings 1110 added to the string table. The leaf nodes 1140 contain references to each of the strings 1110 that contain the segment represented by a particular leaf node.

From the foregoing, it will be appreciated that specific embodiments of the search system have been described herein for purposes of illustration, but that various modifications may be made without deviating from the spirit and scope of the invention. For example, while matching has been described in terms of matching the query segments to the beginnings of segments in the string table, other matching criteria could be used, such as matching based on the query segments being found within any part of a string segment. While the search system has been described in the context of a software development system, it is also possible to use the search system for other areas in which strings can be divided into multiple segments. Accordingly, the invention is not limited except as by the appended claims.

I claim:

1. A method in a computing system having a memory and a processor for selecting strings having multiple segments that match a query string having multiple query segments, the method comprising:

receiving a computer program listing, the computer program listing containing a plurality of strings, each string representing an identifier within the computer program listing;

before receiving any query string, generating a string table by, for each of the plurality of strings of the computer program listing, identifying each string segment contained within the string of the computer program listing, wherein each string segment of the string is identified based on a change in case between adjacent characters in the string of the computer program listing, and adding to the string table a mapping of each identified string segment to the string of the computer program listing that contains the identified string segment;

for each query string received, identifying each query segment contained within the query string, wherein each query segment of the query string is identified based on a change in case between adjacent characters in the query string, comparing query segments of the query string to string segments in the string table, selecting as search results the strings of the computer program listing that match the query string based on the comparison of the query segments of the query string to the string segments in the string table, and with a processor, scoring the search results by, for each string of the computer program listing in the search results, selecting the string of the computer program listing in the search results, for each string segment of the selected string, selecting the string segment in the selected string, for each query segment of the query string, selecting the query segment of the query string, upon determining that the selected query segment matches the selected string segment exactly, adjusting a segment score for the selected string segment and the selected query segment by an exact match amount, upon determining that the selected query segment does not match the selected string segment exactly and upon determining that the selected query segment matches a first portion of the selected string segment, adjusting the segment score for the selected string segment and the selected query segment based on the length of the match, adjusting the segment score for the selected string segment and the selected query segment based on the position of the selected string segment in the selected string, and adjusting a string score for the selected string based on the adjusted score for the selected string segment and the selected query segment; and ranking the search results based on the string score associated with each string of the search results to order the search results based on their associated string scores from highest to lowest.

2. The method of claim 1 wherein when the query string contains a special character at the end of a query segment, only strings containing a string segment that exactly matches the query segment are selected as search results.

3. The method of claim 1 wherein when the query string contains a special character at the end of the query string, only strings containing string segments that exactly match all of the query segments in the query string are selected as search results.

4. A system with a processor and memory for storing and retrieving strings comprising:
- a source code receiving component for receiving a computer program source code document, the computer program source code document containing a plurality of strings relating to programming variable names;
- a string table generating component for, prior to receiving a query string, indexing each of the plurality of strings of the computer program source code document by,
- identifying at least one string segment of a string of the computer program source code document, wherein the string segment is identified based on a change in case between adjacent characters in the string of the computer program source code document, and storing in a string table a mapping between the identified at least one string segment and the string of the computer program source code document;
- a query receiving component for receiving a query string;
- a segment extracting component for dividing a received query string into segments based on a change in case between adjacent characters in the received query string, wherein each character of the received query string belongs to one segment of the received query string; and
- a query processing component for selecting strings of the computer program source code document matching segments of the received query string based on the mappings between string segments and strings of the computer program source code document stored in the string table wherein each string segment within the string table begins with an upper case letter and ends with a lower case letter, and wherein at least one of the components comprises computer-executable instructions stored in memory for execution by the system.

5. The system of claim 4 including a string table updating component for modifying strings in the string table.

6. A computer-readable storage medium containing a data structure for storing strings comprising:
- a computer program listing comprising a plurality of multi-segment strings, wherein the characters of a multi-segment string belongs to exactly one segment of the multi-segment string and wherein each multi-segment string of the computer program listing is segmented prior to receiving a query based on a change in case between adjacent letters of the multi-segment string;
- an index of segment entries, each entry comprising:
- a segment string identifying a segment contained within at least one of the plurality of strings of the computer program listing, wherein the segment string begins with an upper case letter and ends with a lower case letter; and
- a reference to each of the plurality of strings of the computer program listing containing the identified segment wherein the index of segment entries is generated prior to receiving a query string, wherein the index of segment entries is used to identify strings of the computer program listing containing segments at least partially matching query segments of a query string, and wherein the query segments of the query string are identified based on a change in case between adjacent characters in the query string; and
- a version number for detecting changes to the index of segment entries while the index of segment entries is being accessed.

7. The computer-readable storage medium of claim 6 wherein the segment entries are stored in a b-tree.

8. A computer-readable storage medium containing instructions that, when executed by a computer having a memory and a processor, perform a method for identifying strings comprising symbols in a software development project, the method comprising:
- prior to receiving a request to identify strings within the software development project, generating a string table at least in part by,
- for each string of the software development project,
- identifying segments of the string of the software development project based on at least one of a set of separator conditions identified within the string of the software development project, and
- storing within the string table an association between each of the identified segments of the string of the software development project and the string of the software development project;
- after generating the string table,
- receiving requests to identify strings within the software development project, each request comprising a query string, and
- for received request to identify strings within the software development project,
- identifying query segments of the query string of the received request based on at least one of a set of separator conditions identified within the query string,
- for each identified query segment of the query string of the received request,
- using the string table to identify strings within the software development project containing the identified query segment of the query string of the received request.

9. The computer-readable storage medium of claim 8, the method further comprising:
ranking the search results based on how many query segments in the query string match segments in the search results.

10. The computer-readable storage medium of claim 8, the method further comprising:
ranking the search results based on the order in which segments in strings of the search results appear and the order in which query segments in the query string appear.

11. The computer-readable storage medium of claim 8 wherein the symbols include strings exposed by a published application programming interface ("API").

* * * * *